United States Patent [19]

Hart et al.

[11] Patent Number: 5,221,409

[45] Date of Patent: Jun. 22, 1993

[54] APPARATUS FOR BUTT SPLICING PLY STOCK

[75] Inventors: Mary Beth Hart, Uniontown; Richard B. Nash, Cuyahoga Falls, both of Ohio

[73] Assignee: The Goodyear Tire & Rubber Company, Akron, Ohio

[21] Appl. No.: 817,226

[22] Filed: Jan. 6, 1992

[51] Int. Cl.[5] .............................................. B31F 5/00
[52] U.S. Cl. .................................. 156/421; 156/502; 156/582
[58] Field of Search ............... 156/157, 158, 421, 502, 156/580-583

[56] References Cited

U.S. PATENT DOCUMENTS

| | | | |
|---|---|---|---|
| 1,465,177 | 8/1923 | Richter | 156/421 X |
| 2,088,889 | 8/1937 | Wikle | 156/421 X |
| 2,675,854 | 4/1954 | Engler . | |
| 2,702,070 | 2/1955 | Lindemann . | |
| 3,130,100 | 4/1964 | Hasselquist . | |
| 3,909,341 | 9/1975 | Moscovita | 156/502 |
| 3,921,795 | 11/1975 | Vandale et al. . | |
| 4,057,455 | 11/1977 | Klose | 156/421 X |
| 4,231,836 | 11/1980 | Ljungquist et al. | 156/502 X |
| 4,454,000 | 6/1984 | Schlemmer | 156/502 |
| 4,478,672 | 10/1984 | Precht | 156/502 X |
| 4,867,823 | 9/1989 | Pizzorno | 156/502 X |
| 4,994,136 | 2/1991 | Pizzorno | 156/502 |

FOREIGN PATENT DOCUMENTS 641395  3/1964  South Africa .

OTHER PUBLICATIONS

Advertisement for Automatic-splicer 113 by Spezialmaschinebau Steffel of Ratzeburg, Germany, Dec. 1990.

Specifications on automatic splicer by Karl Eugen Fischer GmbH of Burgunstadt, West Germany, Sep. 26, 1990.

Primary Examiner—Robert Spitzer
Attorney, Agent, or Firm—T. P. Lewandowski

[57] ABSTRACT

An apparatus (10) for splicing ply stock comprises structure (40) for splicing two strips of ply stock (24) in end to end relation whereby the edges (26,30) along opposed ends (36,38) of the strips are abutted against each other and the top and bottom surfaces (42,44 & 46,48) of the strips are stitched to each other across the junction (45) between the abutted edges. The structure includes first and second powered splicing units (50,52) disposed above the top surfaces (42,44) and below the bottom surfaces (46,48), respectively, of the stock strips for simultaneous movement across the edges extending the width of the top and bottom surfaces, respectively, whereby the opposed ends of the strips of stock are pressed into the splicing gears (54,56). The edges of the strips are forcibly abutted against each other and portions of the stock are transferred from the top and bottom surfaces of one strip across the junction of the abutting edges to the top and bottom surfaces, respectively, of the other strip to splice the two strips together.

20 Claims, 7 Drawing Sheets

APPARATUS FOR BUTT SPLICING PLY STOCK

While the invention is subject to a wide range of applications, it is particularly suited for butt splicing stock and in particular steel or fabric reinforced ply stock for tires. More specifically, the present invention is adapted for splicing elastomer treated reinforcements, especially bias-cut, elastomer coated steel cord used as ply stock in the manufacture of pneumatic, large tires for earthmoving or farm machinery. The term butt splicing in this specification means adhering an edge of one strip of ply stock to an edge of an adjoining strip of ply stock without overlapping the ends of said stock adjacent said edges.

The present invention is an improvement of the apparatus for butt splicing techniques presently used in the rubber industry. The apparatus for butt splicing, previously used in the rubber industry, were adequate for relatively lighter gauge material, i.e. up to about 0.098 inches thick. However, for heavier gauge material, i.e. from about 0.098 inches to about 0.200 inches, improvements in the splicing equipment are needed for consistent, satisfactory splices.

For example, U.S. Pat. No. 3,130,100 to Hasselquist, covers a splicing mechanism which exerts adequate pressure on opposed edges of two fabric pieces to forcibly butt the edges together into mutual adherence. Moreover, portions of the rubber covering the material from the margin of one edge is transposed to the margin of the other edge and vice-versa. Besides the splicing mechanism being of a relatively complicated construction, it was not effective for splicing materials having a thickness over about 0.098 inches where the adjoining edges at both the top and bottom surfaces of the stock need to be separately spliced together.

The rubber industry also employed a hand operated splicer. Two pieces of rubber covered steel cord fabric are abutted along their edges and spliced together by running a pair of meshing gears over the seam between the abutted edges. The edges of the material are drawn into the turning gears causing the rubber from the margin of one edge to be transposed to the margin of the other edge and vice-versa. The resulting splice appears as though the two pieces of material are stitched or zippered together. In the case of heavier stock, i.e. over about 0.098 inches, the meshed gears only stitched on one side of the material. Then, the two pieces of partially stitched material had to be turned over and stitched on the other side. Hand held splicers were inadequate because they require skilled operators, a relatively long time to complete the stitching process, and the stitching was inconsistent.

Recently, an automatic splicer for steel cord plies used for bus and truck tires was introduced by Spezialmaschinenbau Steffel Gmbh & Co. of Ratzeburg Germany. Strips of material are aligned and simultaneously spliced from either side by two independently operated splicing units moving from the center of the material and proceeding to the outer sides. Each of the splicing units consists of two, independently movable pairs of splicing gears. The upper pair of splicing gears is driven by a motor. The lower pair is understood as being driven by the movement of the gear housing to which the lower splicing gears are secured. This design can be distinguished from the present invention in a number of ways which will become apparent when the present invention is described.

Another automatic splicer was developed by Karl Eugen Fischer Gmbh of Burgkunstadt, Germany. Strips of material are aligned and simultaneously spliced from above and below by two independently operated splicing units moving across the upper and lower material surfaces adjacent the aligned edges of the material strips. Each of the splicing units consists of two pairs of meshed splicing gears. The upper pair of meshed splicing gears is driven by a motor. As the upper, meshed gears are moved across edges of two strips of material, the ends are pulled in between the meshed gears and spliced together. That is, the edges are pressed together and the top surface of the two strips are stitched together across the junction between the pressed edges. Both the upper and lower meshed gear pairs are secured to gear housings which are connected to actuators that reciprocate the housings across the surface of the material strips. The lower meshed gears are not independently powered like the upper meshed gears. Instead, they are driven by the interaction of the lower gear teeth with the material at the ends passing therethrough. As with the upper gears, the lower pair of meshed gears presses the edges of the strips together and stitches the bottom surfaces of the two strips together across the junction between the pressed edges. This design is not directed for heavy gauge material as defined herein and can be distinguished from the present invention in a number of ways which will become apparent when the present invention is described.

It is desirable to provide an apparatus for splicing heavy gauge, elastomer coated ply stock simultaneously on both sides of the stock.

It is an advantage of the present invention to provide an apparatus for splicing heavy gauge, elastomer coated ply stock that obviates one or more of the limitations and disadvantages of the described prior arrangements.

It is a further advantage of the present invention to provide an apparatus for splicing heavy gauge, elastomer coated ply stock having a thickness over about 0.098 inches.

It is a still further advantage of the present invention to produce an apparatus for splicing heavy gauge, elastomer coated ply stock which is relatively inexpensive to produce and retrofit in existing machinery.

According to the present invention, opposing edges of successive pieces of elastomer treated reinforcement, such as bias-cut, elastomer coated steel cord reinforcement for tires used on earth moving vehicles and the like, are automatically butt spliced so that the resulting adhering edges are scarcely discernible and are of substantially the same strength as the elastomer portions intermediate the splices. Moreover, butt splicing for tire cord reinforcements can be accomplished at a relatively high speed.

In accordance with the invention, there is provided an apparatus for splicing elastomer coated ply stock including a device for supporting the ends of two pieces or strips of the ply stock with opposed edges thereof in spaced relationship to each other. Another device simultaneously splices the two pieces of ply stock together along the upper and lower surfaces of the two strips. The latter splicing device includes first and second splicing units. The first splicing unit is a pair of power driven, meshed splicing gears disposed above the opposed edges of the strips of stock. The second splicing unit is a pair of power driven splicing gears disposed below the opposed edges of the stock. Power driving both the upper and lower splicing gears is particularly important for heavy gauge stock used in large tires for earthmoving equipment and the like to insure even, consistent splices on both the upper and lower sides of the stock material.

Further, in accordance with the invention, an apparatus for splicing ply stock comprises means for splicing two strips of ply stock in end to end relation whereby the edges along opposed ends of the strips are abutted against each other and the top and bottom surfaces of the strips are stitched to each other across the junction between the abutted edges. The means for splicing includes first and second splicing units disposed in opposing relationship to each other. The first splicing unit is a first pair of power driven splicing gears adapted to be disposed above the top surfaces of the stock strips. The second splicing unit is a second pair of power driven splicing gears adapted to be disposed below the bottom surfaces of the stock strips. Means are provided for simultaneously moving the first and second splicing units across the edges extending the width of the top and bottom surfaces, respectively, whereby the opposed ends of the strips of stock are pressed into the splicing gears causing the opposed edges to be forcibly abutted against each other and the transfer of portions of the stock from the top and bottom surfaces of one strip across the junction of the abutting edges to the top and bottom surfaces, respectively, of the other strip.

Structure is further provided for simultaneously moving the first and second splicing units along the width of the opposed edges. Simultaneous movement of the splicing units reduces the tendency of the stock to overlap during the splicing procedure and insures that the final spliced product is flat and of the same width at the splice as the elastomer portions intermediate the splices.

In accordance with the invention, a device presses the ends of the stock into the splicing gears being moved along the width of the opposed edges whereby the opposed edges are forcibly abutted against each other into mutual adhering relation. In a first embodiment, the splicing units each include first and second backup rolls disposed on the opposite side of the stock from the first and second splicing gears, respectively, for pressing the stock towards the splicing gears so that the stock is pulled into the splicing gears moving along the length of the edges. The gear and opposing roll setup is particularly effective for lighter gauge stock because the effective force pulling the material into the meshed gears is not that strong and a smoother splice across the junctions of the two strips of material can be achieved. At the same time, this setup can be adjusted to effectively splice heavy gauge stock, i.e. greater than 0.098 inches, by simply increasing the force applied to the stock disposed between the gears and the rollers.

In accordance with a second embodiment of the invention, a pair of first splicing gears are positioned directly above a pair of second splicing gears whereby structure for pressing the ends of the stock into the splicing gears causes the stock to be pulled into the splicing gears moving along the width of the edges. This set up pulls in more material with less force than that required by the gears and opposed rollers of the first embodiment and is particularly beneficial for heavier gauge stock. However, with lighter gauge stock, the opposed gears can be too powerful and cause nonuniform splices.

Another aspect of the invention relates to an auxiliary motor for advancing the first and second pairs of meshed splicing gears in a first direction until the stock is engaged therebetween. Besides helping the splicing gears to move across the width of the pieces of stock, the motor returns the splicing gears to their initial position after the stock is spliced together.

The invention also teaches that each pair of splicing gears comprises first and second, meshed, bevelled gear elements. Each gear element has a first bevelled surface with gear teeth which mesh with the gear teeth of an adjacent gear element whereby the edges of the stock pulled between the gear elements by the pressure of the rollers are abutted against each other between the gear teeth to transfer portions of the stock from one margin across the junction of the abutting edges to the other margin to further amalgamate the edges.

Regarding the bevelled gear elements, each have a second bevelled surface disposed at an acute angle to the first bevelled surfaces. The second bevelled surface of one splicing gear is in contact with the second bevelled surface of an adjacent splicing gear to form a straight contact edge which engages the stock. Concentric, circular grooves on the second bevelled surfaces pull the edges of the two pieces of stock together.

Also in accordance with the invention, the splicing gears are mounted relative to the top and bottom surface of the stock so that an axis extending through the intersection of the meshed gears and perpendicular to the straight contact edge is at an angle of about 75 to about 85 degrees to the stock surface. As the angle decreases from about 85 degrees to about 75 degrees, the pulling force of the gears decreases and the amount of material forming the stitching decreases. On the other hand, as the angle increases to 85 degrees, the pulling force increases and the amount of material forming the stitching increases.

Further, in accordance with the invention, structure is provided to link the first and second splicing gears. The linking structure includes a linking pin. The linking pin is also disposed between the edges of the two pieces of ply stock to prevent them from overlapping prior to being pulled into the splicing gears. Also the linking pin insures that the upper and lower splicing gears move simultaneously with each other for reasons discussed hereinbefore.

The invention and further developments of the invention are now elucidated by preferred embodiments shown in the drawings.

Figure 1:
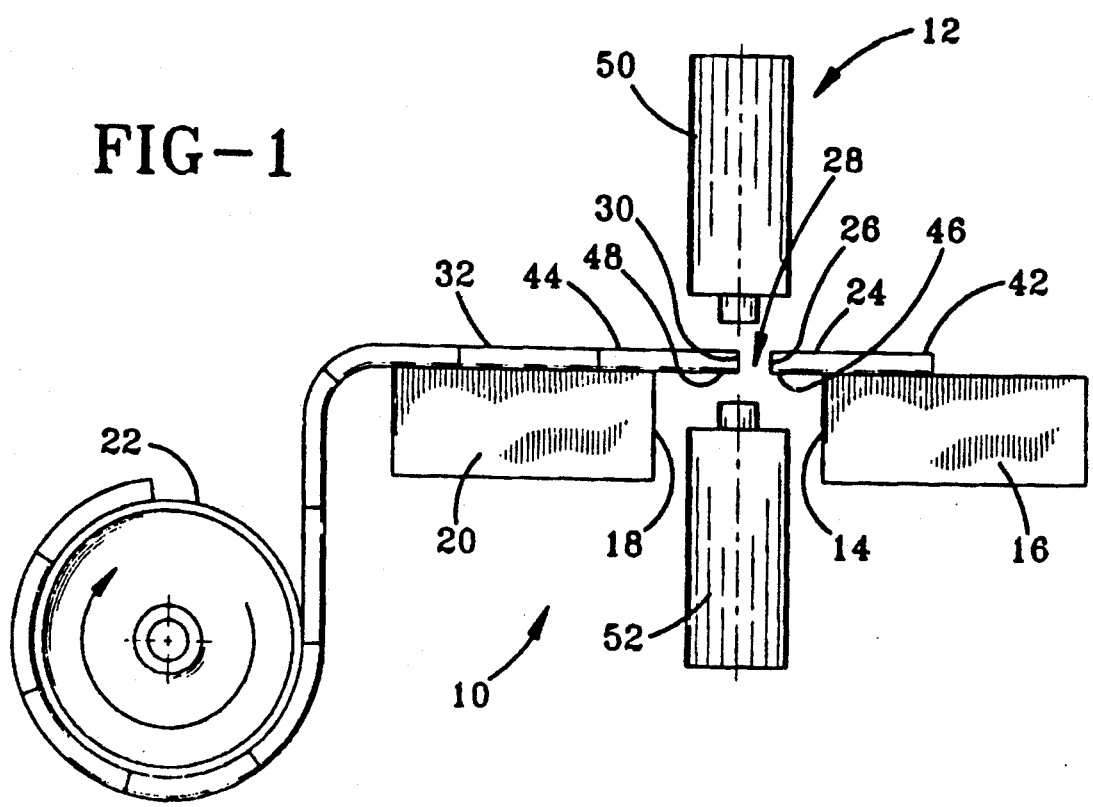
FIG. 1 is a schematic illustration of a splicing system incorporating the splicing apparatus of the present invention.

Referring to FIG. 1, there is illustrated a schematic view of a splicing system 10 for splicing strips of sheet material, such as elastomer covered, steel cord reinforcement used as ply stock in the manufacture of tires for large earth moving and farm machinery. The system 10 includes a splicing head assembly 12 (hereinafter called the "splicer") positioned between the delivery end 14 of a stock supply conveyor 16 and the receiving end 18 of a stock take-off conveyor 20. A windup roll 22, downstream of the conveyor 20, receives the spliced stock.

Figure 2:
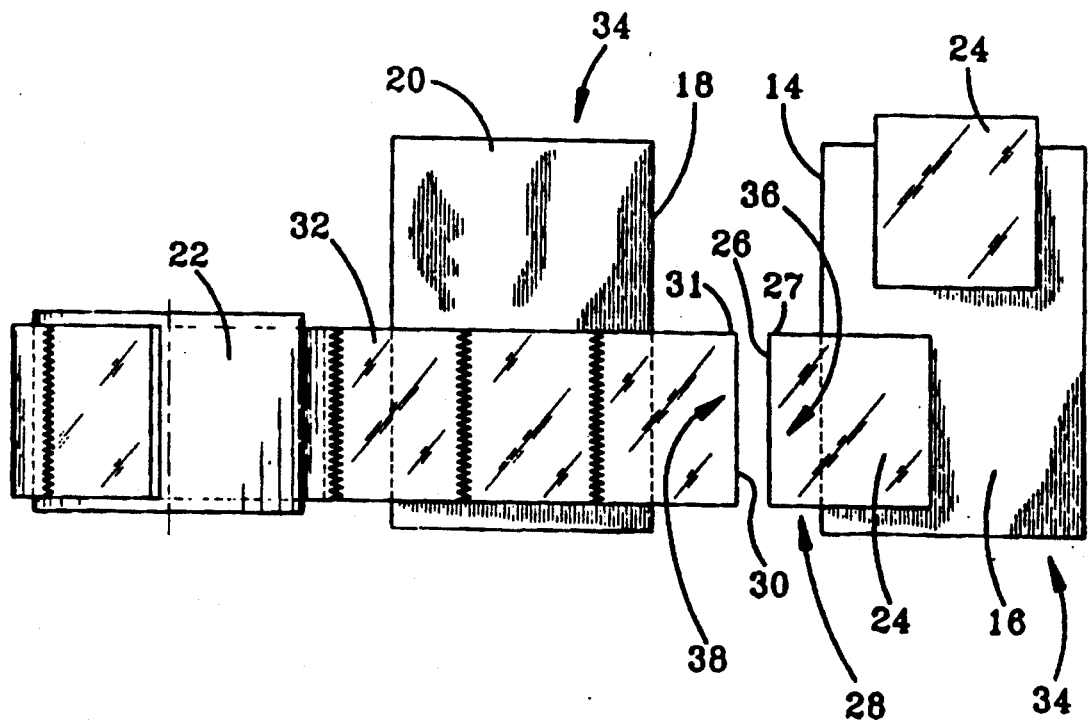
FIG. 2 is a schematic illustration illustrating the movement of the stock material through the splicing system of FIG. 1.

In operation, as seen in FIG. 2, the supply conveyor 16 feeds strips of cut ply stock 24 into position between the splicing head assembly 12. That is, the leading edge 26 of the stock 24 projects over the splicing section 28 between the delivery end 14 of the supply conveyor 16 and the receiving end 18 of the take-off conveyor 20. The trailing edge 30 of the final spliced ply strip 32, i.e. one which was already spliced, is concurrently positioned over the open space designated as splicing section 28. Once the two edges 26 and 30 are properly positioned for splicing, they are butt spliced together along their width with the splicer 12, as discussed hereinafter.

Stock material, as used in the present specification and claims, is preferably elastomer covered, cord reinforcement. While the reinforcement is preferably steel cords encased in an elastomer, it is within the terms of the invention to use other stock material which can be spliced using the machinery and techniques discussed herein. The stock is preferably of a heavy gauge between about 0.098 to about 0.200 inches thick. Stock of this thickness is especially useful in the manufacture of large tires for earth moving machinery and farm equipment.

Figure 3:
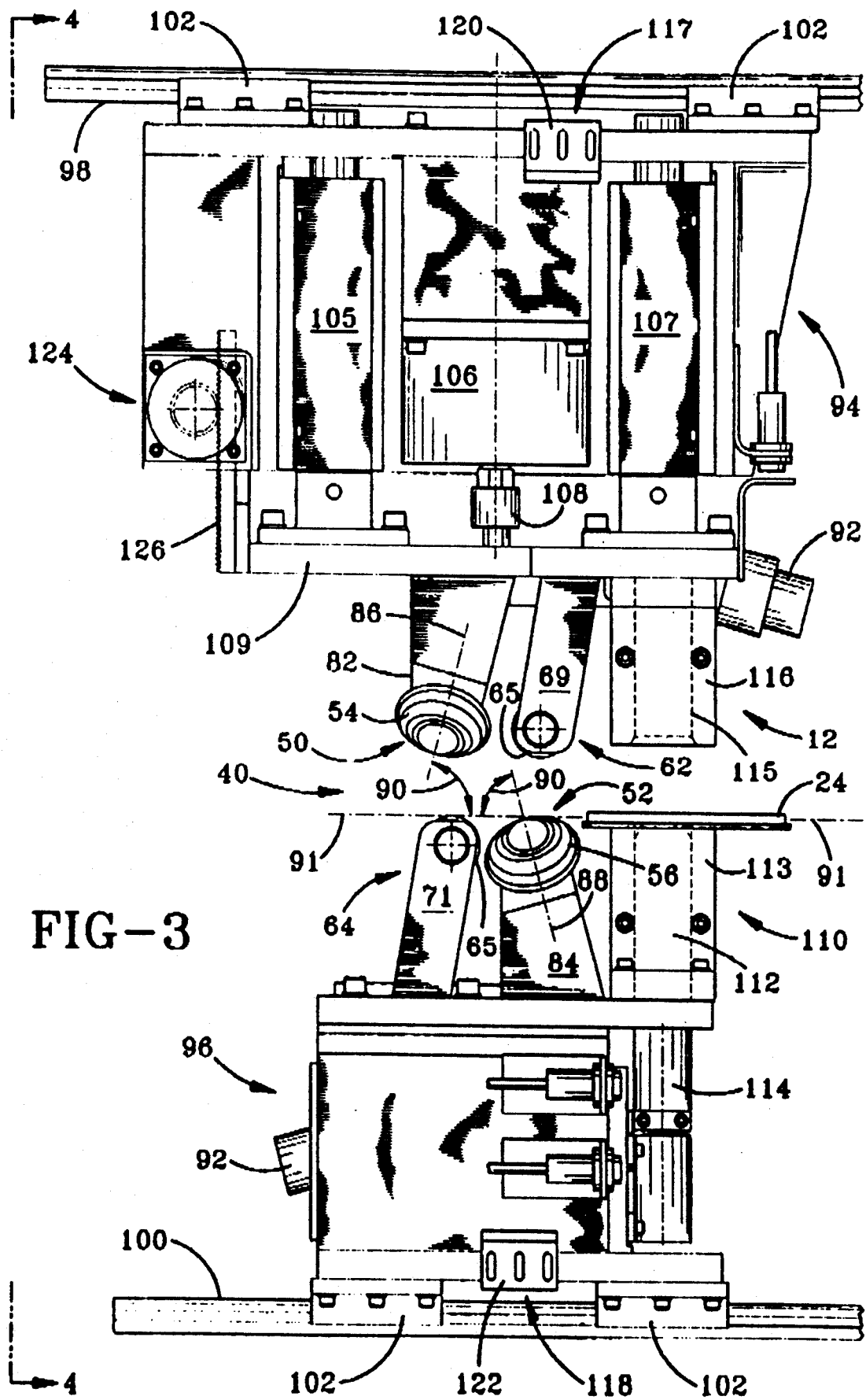
FIG. 3 is a side view of the first embodiment of a novel splicing apparatus in accordance with the present invention.

Referring to FIG. 3, the details of the construction of the splicer 12 can be better understood. The splicer includes means 34 for positioning the leading and trailing ends 36 and 38 of two strips of ply stock, i.e. cut ply stock 24 and spliced strip 32, respectively, so that opposed edges 26 and 30, respectively, are in spaced, parallel relationship to each other. The means 34 includes supply conveyor 16 and take-off conveyor 20. Means 40 are provided for simultaneously splicing the two strips 24 and 32 of ply stock together from above and below. That is, the upper surfaces 42 and 44 of strips 24 and 32, respectively, are stitched together across the junction 45 of the edges at opposed ends 36 and 38, see FIGS. 6 and 7. Concurrently, the lower surfaces 46 and 48 of strips 24 and 32, respectively, are stitched together across the junction 45 between the width of opposed ends 36 and 38.

The means 40 for splicing includes first and second splicing units 50 and 52. The first splicing unit 50 has a pair of power driven, meshed splicing gears 54 disposed above the opening forming splicing section 28, see FIG. 1. Gears 54 are adapted to engage the ends of the upper surfaces 42 and 44 of the strips of stock adjacent opposed edges 26 and 30. The second splicing unit 52 also has a pair of power driven, meshed splicing gears 56, which are substantially identical to splicing gears 54. However, gears 56 are disposed below splicing section 28 and are adapted to engage the ends of the lower surfaces 46 and 48 of the strips of stock adjacent opposed edges 26 and 30.

Figure 3A:
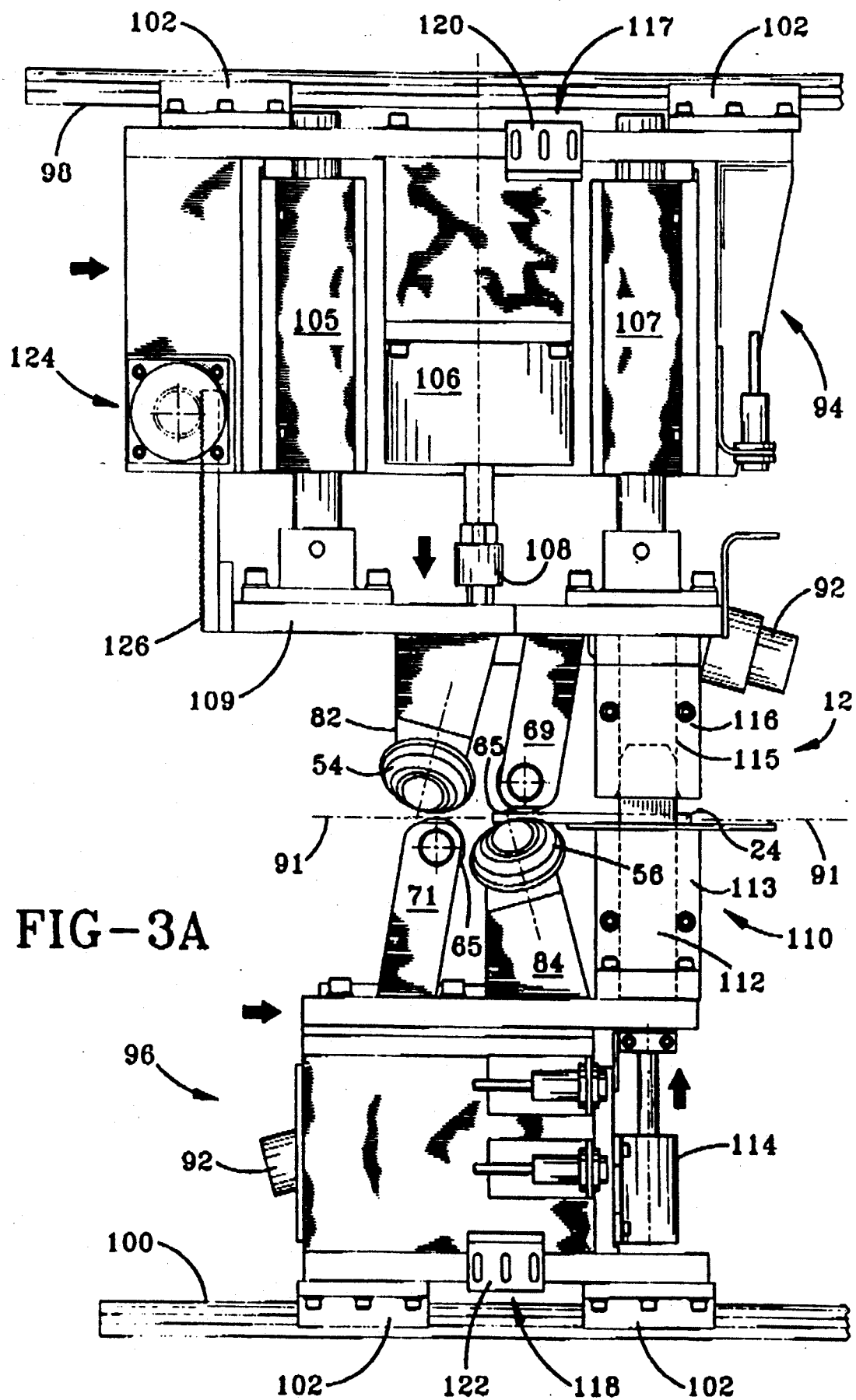
FIG. 3A is a side view of the first embodiment illustrating the stock material clamped between the lower gear and the upper roller and the pin engaged in the locking position.
Figure 3B:
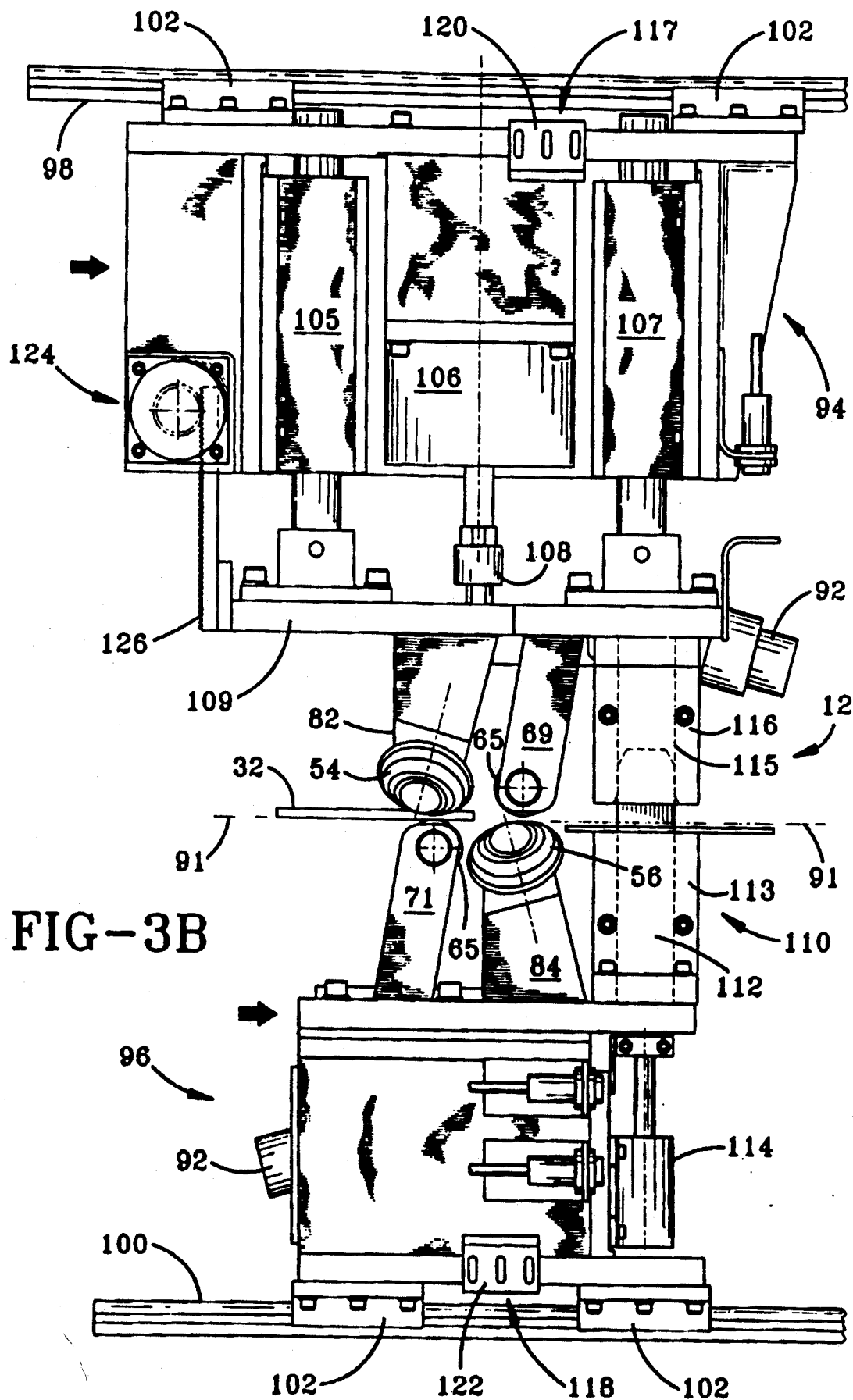
FIG. 3B is a side view of the first embodiment illustrating the stock material at the end of the splicing operation clamped between the upper gear and the lower roller.
Figure 4:
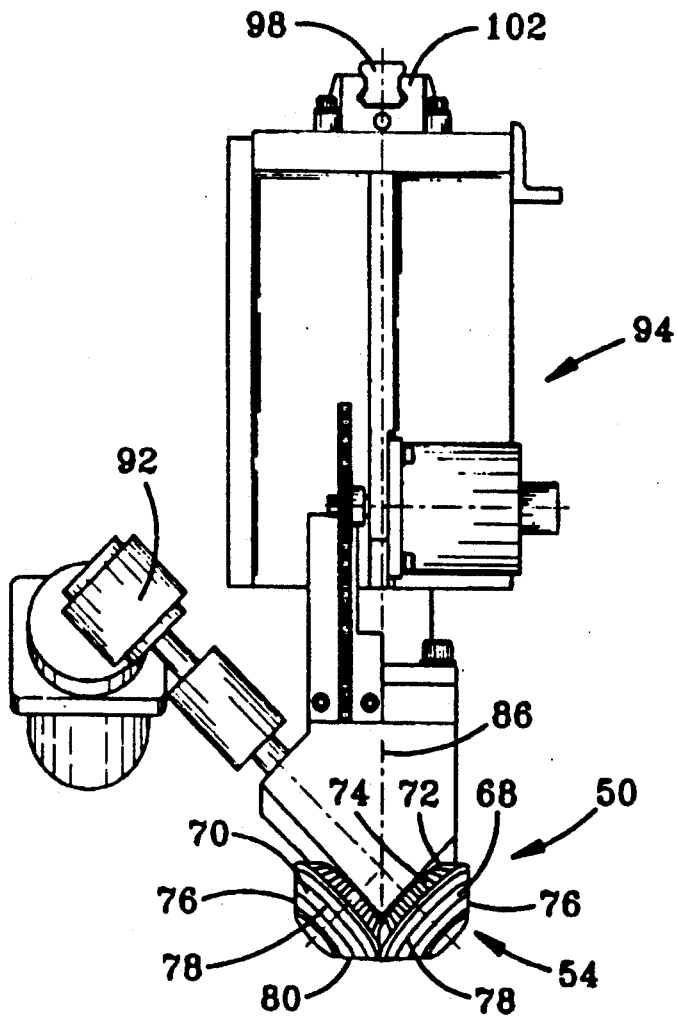
FIG. 4 is a view taken along the line 4—4 of FIG. 3.
Figure 4:
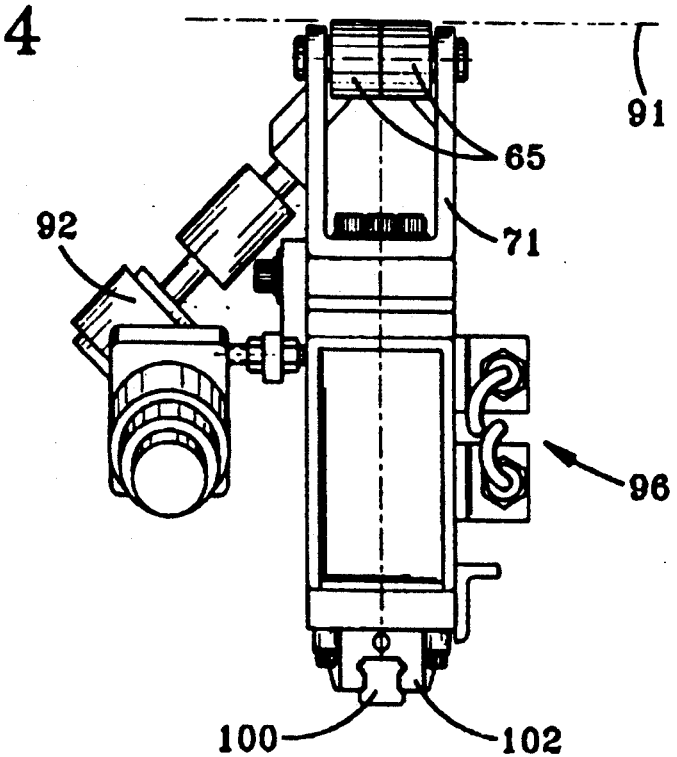

In the first embodiment, as illustrated in FIGS. 3, 3A and 3B, the splicing units 50 and 52 include first and second backup roll means 62 and 64, respectively, positioned opposite from the first and second splicing gears 54 and 56, respectively. The backup roll means, as illustrated in FIG. 4, each includes a pair of freely rotating rollers 65 which are mounted on roller housings 69 and 71 to oppose the pair of splicing gears 54 and 56. During operation of the system, the backup roll means are positioned on the opposite side of the stock from splicing gears and enable the stock to be pressed into the splicing gears. At the same time, the rollers allow the stock material to move freely between the first and second splicing gears moving along the width of the edges between the sides of the strips of material.

Referring to FIG. 4, each pair of first and second splicing gears 54 and 56, respectively, is substantially identical and comprises first and second bevelled gear elements 68 and 70. Each gear element has a first bevelled surface 72 with gear teeth 74 which mesh with the gear teeth of the adjacent gear element. In addition, the first and second gear elements each have a second bevelled surface 76 disposed at an acute angle to the first bevelled surface 72. Concentric spaced circular grooves 78 are disposed on the second bevelled surfaces. The second bevelled surfaces 76 of each of said splicing gears are abutted with each other to form a straight contact edge 80 which engages the surface of the stock as the gear elements rotate.

The first and second splicing gears 54 and 56 are mounted to gear housings 82 and 84, respectively, and positioned relatively close to the flat upper surface of the supply conveyor 16 and the take off conveyor 20. The axes 86 and 88 through the gear housings 82 and 84 extend perpendicular to the straight contact edge 80 and at an angle 90 of about 75 to about 85 degrees to a plane 91 through the flat, upper surfaces of the conveyors 16, 20. Preferably, the angle 90 is selected to be about 80 degrees. As the angle is reduced from about 85 degrees to about 75 degrees, the force pulling the ends of the stock into the splicing gear teeth is increased but the amount of material forming the stitches and the height which they protrude above the surface of the stock material increases. This can be detrimental later in the manufacturing process because an undesirable bump can result in the completed tire. Contrarily, as the angle is increased from about 75 degrees to about 85 degrees, the stitches are formed of less material and do not protrude to a detrimental extent above the surface of the stock. However, the force pulling the ends of the stock into the meshed gears is reduced and can in an extreme case not provide enough force to properly bond the two strips together.

In each of the splicing gears, one of the gear elements is driven by a motor and the other gear element is powered by the first gear element. For example, as illustrated in FIG. 4, gear element 68 is driven by a motor 92. Preferably, the motor is air driven. Pressure transducers are provided on each motor to accurately indicate the air pressure so that the motors can be adjusted to operate at the same speed. Further, it is within the terms of the invention to substitute any conventional motor such as an electric motor for the motor 92.

Another important aspect of the invention relates to the means 60 for simultaneously moving the first and second splicing units 50 and 52 along the width of the opposed edges 26 and 30. Simultaneous movement is an important because it maintains the alignment of the splicing units with the backup rollers 62 and 64 or opposing splicing unit, as in the second embodiment to maintain the desired pressure on the top and bottom surfaces of the stock.

The means 60 for moving the splicing units 50 and 52 includes a top support block 94 and a bottom support block 96. Both of the blocks are mounted to slide on upper and lower rails 98 and 100 through slides 102. The second or bottom splicing unit 52 and the bottom roller support 71 is secured to the bottom support block 96 so that the rollers 65 as well as the splicing gears 54 and 56 remain in a fixed position with respect to plane 91 extending through the system 10. The top support block 94 includes actuating cylinder 106 and coupler 108 which lowers and raises a base support 109 to which the roller support 69 and the gear housing 82 are secured. The base support 109 is maintained in a horizontal position by two cylinders 105 and 107. The actuating cylinder 106 moves the roller support 69 and the gear support housing 82 towards the plane 91 when stock is to be spliced and away from the plane after the splicing is completed.

The means 60 for moving the splicing units 50 and 52 also includes a retractable pin assembly 110. The pin assembly 110 interconnects the first and second splicing units 50 and 52 to ensure that splicing units move simultaneously away from an initial position in a first direction while splicing the two strips of ply stock together. The pin assembly includes a reciprocating pin 112 which is retracted into a rectangular housing 113 by a conventional piston drive 114 for disconnecting the splicing units 50 and 52 while moving them in a second direction opposite to the first direction to return the splicing units to their initial position. The rectangular housing 113 and the piston drive are affixed to the bottom support block 96. When the upper and lower splicing gear assemblies 50 and 52 are to be interconnected, the pin 112 is extended by the piston drive 114 into a cylindrical opening 115 in housing 116 secured to plate 109. The pin 112, in the extended position, is located between the leading edge 26 and the trailing edge 30 of the stock. The presence of the pin 112 between the strips of stock prevents the edges from being pulled together and possible overlapping prior to the edges being pulled into the gear teeth of the first and second splicing gears 50 and 52.

The means 60 for moving the splicing units 50 and 52 further includes drives 117 and 118 that are secured to the splicing units for pulling the interconnected units across the length of the stock edges and then returning the splicing units to their initial positions to start the sequence again. Preferably, the drives include drive plates 120 and 122 which are connected to any conventional drive structure such as a chain drive or cylinder rods (not shown). The drive plates are pulled by the chain drive and cause the top support block 94 and the bottom support block 96 to slide across upper and lower rails 98 and 100.

In operation, after the two edges 26 and 30 of the two strips of stock material 24 and 32 are abutted against each other, the upper splicing unit 50 is lowered downward so that the strips are disposed between the contact edge 80 of the lower splicing gears 56 and the rollers 65, as illustrated in FIG. 3A. Simultaneously, pin 112 is extended into the open rectangular socket 115. While the upper and lower splicing gears are rotated by motors 92, the upper and lower splicing units are moved from right to left as shown in FIG. 3A by the drives 117 and 118. As previously explained, the pin 112 which is now extended into socket 115, insures that the upper and lower gear units move at exactly the same speed. The edges of the stock are drawn together by the concentric grooves 78 and then pressed into the meshed gear teeth of the upper and lower gear splicing units whereby where the edges near the top surfaces and the bottom surfaces are drawn together causing the elastomer from the margin of one edge to be transposed to the margin of the other edge and vice-versa. Since the gear units 50 and 52 are offset from each other, the splicing of the bottom surfaces of the strips by the meshed gears of gear unit 52 occurs prior to the splicing of the upper surfaces of the strips of stock material by the gears of gear unit 50.

Figure 6:
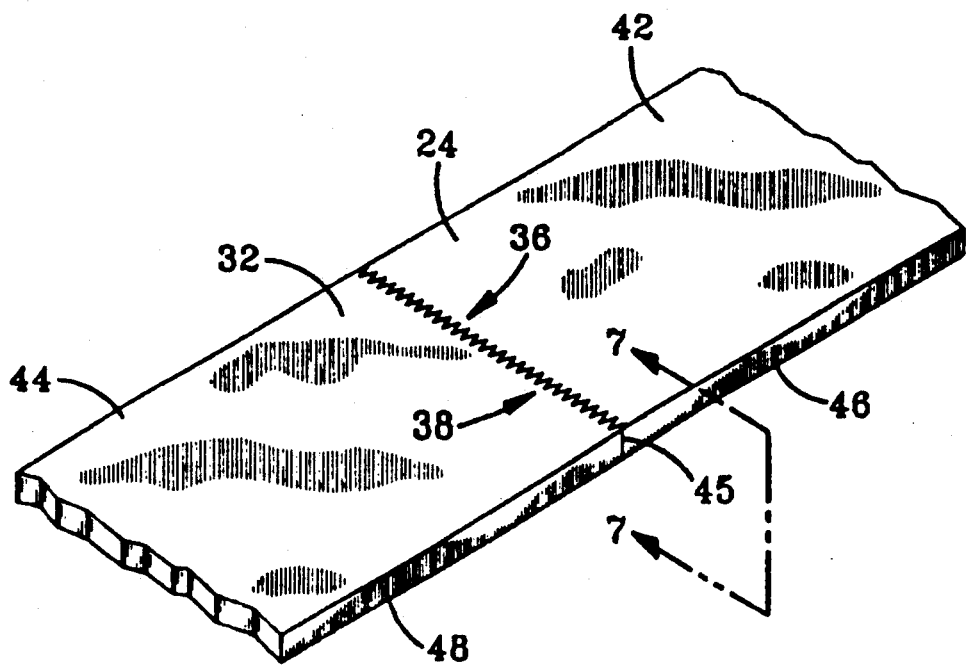
FIG. 6 is a three dimensional view of two pieces of stock spliced together in accordance with the invention.
Figure 7:
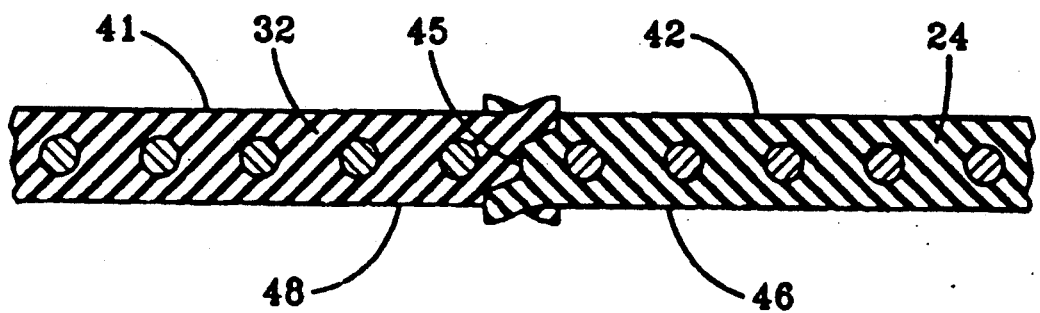
FIG. 7 is a view through line 7—7 of FIG. 6.

Another noteworthy aspect of the invention is that the pin 112 prevents the edges of the material from overlapping as they are being drawn together by the action of the concentric grooves. Just before the linked splicing units 50 and 52 reach the end of their travel, only the gears of the upper gear unit 50 are in contact with the upper surface of the material, as illustrated in FIG. 3B. When the splice is completed, the wind-up roll 22 can pull the completed spliced ply strip 32 across the take-up conveyor 22 until the trailing edge 30 is positioned over the open space designated as splicing section 28. The resulting splice, as illustrated in FIGS. 6 and 7, appears as though the two strips are stitched or zippered together. Note that the junction 45 of the two edges of the strips are abutted against each other while the elastomer material on the top and bottom surfaces of the strips are transferred across the junction. The result is a zippered appearing splice as illustrated in FIGS. 6 and 7 having steel cords embedded in the elastomer.

Another significant aspect of the invention is that both the upper and lower gear units are independently powered. The rotation of the meshed gear elements, by the air motors 92, is the primary source of power causing the splicing units to move from one side of the stock material to the other. By powering both the upper and lower splicing units, enough power is available so that the units move smoothly across the material. If only one of the gear units were powered, as in the prior art, that powered gear unit would have to move both of the gear units since they are physically connected together by the pin. Because of the extra power needed for a single powered gear unit to deliver enough power to operate both the powered as well as the unpowered gear units, there is a tendency for the powered meshed gears to chew up the material being spliced. To overcome this potential problem, the present invention provides motors 92 for both the upper and lower gear units.

To further improve the speed and smoothness of operation, the power drives 117 and 118 move the top and bottom support blocks 94 and 96 along the rails 98 and 100 from the initial position to an end position and back to the initial position. Thus, if there are any slight inconsistencies in the stock which might hangup the movement of the gear units, it is overcome by the extra power from the power drives.

Another feature of the present invention is displacement encoder 124 with a rack and pinion arrangement 126. In the case of a jam up in the stock being spliced, which causes the splicing unit 50 to move upward away from the plane 91, the encoder will stop the stitching action of the system 10.

Figure 5:
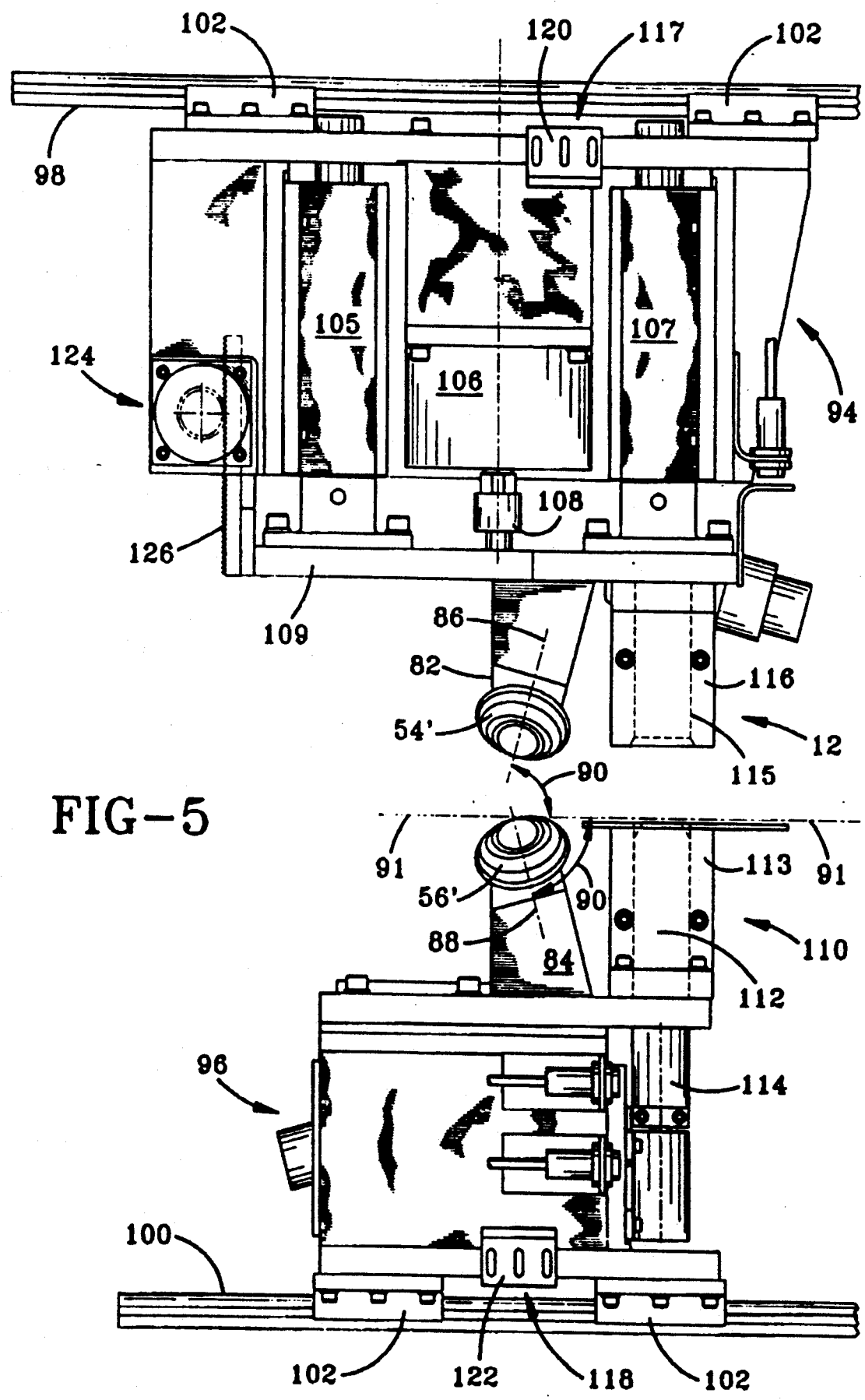
FIG. 5 is a partial side view of the second embodiment of a novel splicing apparatus in accordance with the present invention.

Referring to FIG. 5, there is illustrated a second embodiment of the present invention. The splicing gear units 54' and 56' are opposed from each other and no backup roll is required. The splicing systems of both embodiments are essentially identical except for the positioning of the gear units and the deletion of the backup rolls and the same reference numerals indicate elements which are identical in both embodiments. The prime reference numerals indicate elements which are essentially identical to the elements indicated by the same unprimed reference numerals in the first embodiment except for the deletion and repositioning of elements discussed above. The advantage of the opposed configuration of the second embodiment is that less stitching force is required. That is, less force is required to press upper gear unit 54' against the lower gear unit 56' as compared with the force used to press the rollers 65 against the meshed splicing gears of the upper and lower gear units of the first embodiment.

The patents set forth in this specification are intended to be incorporated in their entireties by reference herein.

It is apparent that there has been provided in accordance with this invention an apparatus for splicing strips of ply stock that satisfies the objects, means and advantages set forth hereinbefore. While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. An apparatus for splicing ply stock, comprising:
means for splicing two strips of ply stock in end to end relation whereby the edges along opposed ends of the strips are abutted against each other and the top and bottom surfaces of the strips are stitched to each other across the junction between the abutted edges;
said means for splicing including first and second splicing units disposed facing top and bottom surfaces of said strips, said first splicing unit having a first pair of power driven splicing gears adapted to be disposed above the top surfaces of the stock strips, said second splicing unit having a second pair of power driven splicing gears adapted to be disposed below the bottom surfaces of the stock strips;
means for simultaneously moving said first and second splicing units across the edges extending the width of the top and bottom surfaces, respectively, whereby said opposed ends of said strips of ply stock are pressed into the first and second pairs of power driven splicing gears causing the opposed edges to be forcibly abutted against each other and the transfer of portions of the stock from the top and bottom surfaces of one strip across the junction of said abutted edges to the top and bottom surfaces, respectively, of the other strip.

2. The apparatus of claim 1 wherein said means for splicing includes first and second freely rotating backup roll means disposed on the opposite surface of the stock from said first and second splicing gears, respectively, for pressing said strips of ply stock into the splicing gears so that said strips of stock are pulled into the first and second splicing gears moving along the width of the abutted edges.

3. The apparatus of claim 2 wherein the means for simultaneously moving said splicing units includes means for driving said first and second splicing gears in a first direction from an initial position until a final position when the stock is spliced together and in a second, opposite direction to return the splicing gears to their initial position.

4. The apparatus of claim 2 wherein each pair of said first and second splicing gears comprise first and second bevelled gear elements each having a first bevelled surface with gear teeth which mesh whereby the pressing of said stock between said bevelled gear elements by the pressure of said freely rotating backup roll means causes the edges of the two strips of ply stock to be abutted against each other and the transfer of portions of the stock from the top and bottom surfaces across the junction of said abutted edges to the other top and bottom surfaces whereby the strips of stock are securely spliced to each other.

5. The apparatus of claim 4 wherein each pair of said first and second splicing gears comprise first and second bevelled gear elements each having a second bevelled surface disposed at an acute angle to said first bevelled surfaces, said second bevelled surfaces of each of said splicing gears being abutted with each other to form a straight, contact edge which engages the surface of the stock.

6. The apparatus of claim 5 wherein the first and second splicing units are offset from each other.

7. The apparatus of claim 5 wherein said first and second splicing gears are mounted relative to the top and bottom surface of said stock so that an axis extending perpendicular to said straight contact edge is at an angle of about 75 to about 85 degrees to said stock surface.

8. The apparatus of claim 1 further including retractable means for connecting said first and second splicing units to simultaneously move said splicing units in a first direction from an initial position while splicing said two strips of ply stock and for disconnecting said splicing units while moving said first and second splicing units in a second direction opposite to said first direction to return said splicing units to their initial position.

9. The apparatus of claim 8 wherein said retractable means includes a reciprocating pin being disposed between the edges of said two strips of ply stock to prevent them from overlapping prior to being pulled into the splicing gears.

10. The apparatus of claim 1 further including means to stop splicing said strips of stock together when they overlap.

11. The apparatus of claim 1 including means for positioning two strips of said ply stock in end to end relationship with each other.

12. The apparatus of claim 1 including means for pressing said opposed ends of said strips of ply stock into said first and second pairs of splicing gears whereby said strips of ply stock are pulled into said first and second pairs of splicing gears moving along the width of said abutted edges, said means for pressing including means for positioning said first pair of power driven splicing gears directly above said second pair of power driven splicing gears.

13. The apparatus of claim 12 wherein said means for pressing said opposed ends of said ply stock into said first and second pairs of splicing gears comprises means for moving said first pair of power driven splicing gears towards said second pair of power driven splicing gears.

14. The apparatus of claim 13 wherein each pair of said first and second splicing gears comprise first and second bevelled gear elements each having a first bevelled surface with gear teeth which mesh whereby the stock pressed between said gear elements by the pressure therebetween causes the edges of said two strips of ply stock to be abutted against each other and the transfer of portions of the stock from the top and bottom surfaces across the junction of the abutting edges to the other top and bottom surfaces whereby said two strips of ply stock are securely spliced to each other.

15. The apparatus of claim 14 wherein each pair of said first and second splicing gears comprises first and second bevelled gear elements each having a second bevelled surface disposed at an acute angle to said first bevelled surfaces, said second bevelled surfaces of each of said splicing gears being in contact with each other to form a straight contact edge which engages the stock.

16. The apparatus of claim 15 wherein said first and second splicing gears are mounted relative to the top and bottom surface of said stock so that an axis extending perpendicular to said straight contact edge is at an angle of about 75 to about 85 degrees to said stock surface.

17. The apparatus of claim 16 wherein said first gear element is driven by a motor and said second gear element is powered by the first gear element.

18. An apparatus for splicing ply stock, comprising:
means for splicing two strips of ply stock in end to end relation whereby the edges along opposed ends of the strips are abutted against each other and the top and bottom surfaces of the strips are stitched to each other across the junction between the abutted edges;
said means for splicing including first and second splicing units disposed facing either surface of said strips, said first splicing unit being a first pair of power driven splicing gears adapted to be disposed above the top surfaces of the stock strips, said second splicing unit being a second pair of power driven splicing gears adapted to be disposed below the bottom surfaces of the stock strips;
means for simultaneously moving said first and second splicing units across the edges extending the width of the top and bottom surfaces, respectively, whereby the opposed ends of the strips of stock are pressed into the splicing gears causing the opposed edges to be forcibly abutted against each other and the transfer of portions of the stock from the top and bottom surfaces of one strip across the junction of the abutting edges to the top and bottom surfaces, respectively, of the other strip;
said means for splicing including first and second backup roll means disposed on the opposite surface of the stock from said first and second splicing gears, respectively, for pressing said stock into the splicing gears so that the stock is pulled into the first and second splicing gears moving along the width of the edges;
each pair of said first and second splicing gears comprising first and second bevelled gear elements each having a first bevelled surface with gear teeth which mesh whereby the stock pressed between said gear elements by the pressure of said backup roll means causes the edges of the stock to be abutted against each other and the transfer of portions of the stock from the top and bottom surfaces across the junction of the abutting edges to the other top and bottom surfaces whereby the strips of stock are securely spliced to each other; and
each pair of said first and second splicing gears comprise first and second bevelled gear elements each having a second bevelled surface disposed at an acute angle to said first bevelled surfaces, said second bevelled surfaces of each of said splicing gears being abutted with each other to form a straight, contact edge which engages the surface of the stock.

19. An apparatus for splicing ply stock, comprising:
means for splicing two strips of ply stock in end to end relation whereby the edges along opposed ends of the strips are abutted against each other and the top and bottom surfaces of the strips are stitched to each other across the junction between the abutted edges;
said means for splicing including first and second splicing units disposed facing either surface of said strips, said first splicing unit being a first pair of power driven splicing gears adapted to be disposed above the top surfaces of the stock strips, said second splicing unit being a second pair of power driven splicing gears adapted to be disposed below the bottom surfaces of the stock strips;
means for simultaneously moving said first and second splicing units across the edges extending the width of the top and bottom surfaces, respectively, whereby the opposed ends of the strips of stock are pressed into the splicing gears causing the opposed edges to be forcibly abutted against each other and the transfer of portions of the stock from the top and bottom surfaces of one strip across the junction of the abutting edges to the top and bottom surfaces, respectively, of the other strip;
said first splicing gears are directly above said second splicing gears whereby the pressing of said stock into the splicing gears causes the stock to be pulled into the gears moving along the width of the edges;
said pressing of the stock into the splicing gears comprises means for moving said first splicing gears towards said second splicing gears;
each pair of said first and second splicing gears comprising first and second bevelled gear elements each having a first bevelled surface with gear teeth which mesh whereby the stock pressed between said gear elements by the pressure therebetween causes the edges to be abutted against each other and the transfer of portions of the stock from the top and bottom surfaces across the junction of the abutting edges to the other top and bottom surfaces whereby the pieces of stock are securely spliced to each other; and
each pair of said first and second splicing gears comprising first and second bevelled gear elements each having a second bevelled surface disposed at an acute angle to said first bevelled surfaces, said second bevelled surfaces of each of said splicing gears being in contact with each other to form a straight contact edge which engages the stock.

20. An apparatus for splicing ply stock, comprising:
means for splicing two strips of ply stock in end to end relation whereby the edges along opposed ends of the strips are abutted against each other and the top and bottom surfaces of the strips are stitched to each other across the junction between the abutted edges;

said means for splicing including first and second splicing units disposed facing either surface of said strips, said first splicing unit being a first pair of power driven splicing gears adapted to be disposed above the top surfaces of the stock strips, said second splicing unit being a second pair of power driven splicing gears adapted to be disposed below the bottom surfaces of the stock strips;

means for simultaneously moving said first and second splicing units across the edges extending the width of the top and bottom surfaces, respectively, whereby the opposed ends of the strips of stock are pressed into the splicing gears causing the opposed edges to be forcibly abutted against each other and the transfer of portions of the stock from the top and bottom surfaces of one strip across the junction of the abutting edges to the top and bottom surfaces, respectively, of the other strip;

means to link the first and second splicing units, said means to link said first and second splicing units including a linking pin, said linking pin further being disposed between the edges of the two pieces of ply stock to prevent them from overlapping prior to being pulled into the splicing gears.

* * * * *